(12) United States Patent
Norman et al.

(10) Patent No.: US 7,093,150 B1
(45) Date of Patent: Aug. 15, 2006

(54) WAVEFRONT CLOCK SYNCHRONIZATION

(75) Inventors: Richard Norman, Sutton (CA); David Chamberlain, Verdun (CA)

(73) Assignee: Richard S. Norman, Sutton (CA)

( * ) Notice: Subject to any disclaimer, the term of this patent is extended or adjusted under 35 U.S.C. 154(b) by 530 days.

(21) Appl. No.: 10/330,068

(22) Filed: Dec. 30, 2002

Related U.S. Application Data (60) Provisional application No. 60/343,165, filed on Dec. 31, 2001.

(51) Int. Cl.
  *G06F 1/12* (2006.01)
  *G06F 1/04* (2006.01)

(52) U.S. Cl. ............ 713/401; 713/400; 713/500; 713/503

(58) Field of Classification Search ............ None
  See application file for complete search history.

(56) References Cited

U.S. PATENT DOCUMENTS

| | | | | |
|---|---|---|---|---|
| 5,652,530 A | * | 7/1997 | Ashuri | 326/93 |
| 5,701,447 A | * | 12/1997 | Hahn | 713/600 |
| 5,867,448 A | * | 2/1999 | Mann | 365/233 |
| 6,087,867 A | * | 7/2000 | Holm | 327/144 |
| 6,327,207 B1 | * | 12/2001 | Sluiter et al. | 365/221 |
| 6,570,944 B1 | * | 5/2003 | Best et al. | 375/355 |
| 6,963,989 B1 | * | 11/2005 | Cullum et al. | 713/401 |

* cited by examiner

*Primary Examiner*—James K. Trujillo (57) ABSTRACT

The invention provides for the arrangement and management of timing of various domains on a large integrated circuit which introduces a phase offset between clock domains of neighboring cells to create a wavefront clock which propagates through the circuit at the same speed data propagates though the circuit. The cells of the integrated circuit are wavefront clock synchronized in that the phase offset introduced in a particular cell's clock is such that the arrival of a skewed clock and propagation delayed data from that cell's neighbor is synchronized with that particular cell's own clock. Wavefront clock synchronization mitigates at least some of the problems of clock skew and the associated effects of slowing data propagation and reduction of clock frequencies associated with large surface integrated circuits utilizing synchronized clock domains.

8 Claims, 5 Drawing Sheets

WAVEFRONT CLOCK SYNCHRONIZATION

CROSS-REFERENCES TO RELATED APPLICATIONS

The present application claims the benefit under 35 USC 119(e) of prior U.S. Patent Application Ser. No. 60/343,165 to Richard Norman, filed on Dec. 31, 2001 and incorporated by reference herein.

FIELD OF THE INVENTION

The invention relates to timing on integrated circuits implemented on semiconductor wafers, and more particularly, to the arrangement and management of clock domains in cells of an integrated circuit.

BACKGROUND OF THE INVENTION

Electronic signals within large integrated circuits suffer from substantial propagation delays upon being transmitted across the circuit areas. The propagation delays are a function of distance and are due to the parasitic reactances, the small but finite wire resistances and transistor switching times. The problem is further complicated by the fact that these delays are distributed across the area of the integrated circuit such that their effect on the propagation of the signals is typically not evenly felt everywhere within the area of the circuit. This effect is most readily seen in the timing of digital circuits that operate using a periodic square-wave clock signal to control the timing of the operations of a digital integrated circuit. After having originated in one part of an integrated circuit, a clock signal will be noticeably out of phase with its source by the time it reaches a point within the integrated circuit substantially far away from its source. This problem is commonly referred to as clock skew and leads to errors in the propagation of signals across the circuit. Various approaches to skew compensation across a single large clock domain can be used, but these approaches typically suffer from inefficiencies in that once a sufficient clock skew has occurred data often must wait for subsequent clock cycles in order to propagate in phase with the clock. Conversely, some approaches involve the reduction of the clock frequency so that purely on a time scale basis the clock and propagation delays become small in comparison to the clock period to mitigate the effects of clock skew. Using those approaches a clock rate which minimizes the effects of clock skew is limited by the propagation delay. Lowering the clock rate is, however, undesirable because it reduces the processing speed of the integrated circuit.

An approach using H-trees has been used in an attempt to solve problems associated with clock skew and phase delay. This particular approach is a way of dividing up a circuit area and having paths, which are of equal length to all points in the circuit. For example, the path distance from the center of a first H of an H-tree to the tip of an edge of the H is the same for all four tips of the H. If each of the tips of each edge of the first H is located at the center of a respective smaller H, the path length from the center of the first H to the sixteen tips of the smaller H's is the same. If one covers the area of a circuit in this recursive manner, the final tip points of the numerous smallest H's of the H-tree will all be the same distance from the center of the first H of the H-tree. This can be used to ensure that the clock arrives at all points substantially simultaneously. Half of the problem however remains unsolved. Although the problem of clock synchronization is solved, the data set will end up out of synchronization with the clock. In the context of large area circuits, however, this approach does not solve the problems. In such a case, even if one sends data synchronous with the clock, by the time it arrives at a remote position it is out of sync with the clock at that position.

One more effective approach to compensate for clock skew, or more generally propagation delays, is to divide an integrated circuit occupying a large area into a number of smaller discrete functional modules or cells. Each cell is made small enough so that propagation delays are small enough such that a single timing domain or clock domain can control transmission through that cell. In this approach, there exist multiple clocks within the same integrated circuit, one for each cell the integrated circuit is divided into. Each cell can then be considered as having its own clock domain.

Sub-dividing the integrated circuit into cells each having its own clock domain to facilitate high-speed data transfer amongst the cells adjacent to one another can be done with clocks of adjacent cells being synchronized to one another, but this requires integral numbers of clock cycles between cells creating unnecessary delays for short inter-cell connections or for signals that cross many cells. Hence the rate of data propagation can be limited by the clock frequency. Another technique is for the cells not to be synced and to have inter-cell signals cross these unsynchronized clock domain boundaries, but this requires substantial amounts of synchronization circuitry to align signals to the clocks of different cells. All of this additional circuitry for synchronization limits the amount of area on the substrate that can be used for the intended purposes of the integrated circuit.

It would be desirable for there to be an arrangement and management of timing various domains on an integrated circuit which minimizes the problems of clock skew and the associated effects of slowing data propagation, and reducing clock frequencies current solutions introduce.

SUMMARY OF THE INVENTION

The present invention provides for the arrangement and management of timing various domains on a large integrated circuit which, to mitigate at least one of the problems of clock skew and the associated effects of slowing data propagation and reduction of clock frequencies, introduces a phase offset between clock domains of neighboring cells to create a wavefront clock which propagates through the circuit contemporaneously with data propagating though the circuit. The cells of the integrated circuit are synchronized to this wavefront clock in that the phase offset introduced in a particular cell's clock is such that the arrival of a skewed clock and propagation delayed data from its neighbor is synchronized with that particular cell's own clock. Since the clock propagation delay through each cell itself is being used as the offset for the clock timing of the neighboring cell, the clock frequency is not limited by the clock skew, and since data propagating from cell to cell travels in phase with the wavefront clock, the data does not need to wait for subsequent clock cycles to propagate through the cells.

According to a fist broad aspect, the invention provides for an arrangement of integrated circuit cells comprising having at least one cell having a root clock source generating a root clock signal, and at least one other cell having at least one clock domain, the at least one clock domain having a clock source, the clock source generating a time-delayed clock signal which is a time-delayed version of the root clock signal, in which the time-delayed clock signal is delayed with respect to the root clock signal by a time corresponding to a data propagation delay for data to propagate from the root clock source to the clock source of the clock domain.

In some embodiments of the invention, the cells are arranged in a row, in which the at least one cell has is a first cell situated at a first end of the row, and in which the at least one clock domain is associated with the root clock source of the first cell.

Advantageously, some embodiments of the invention further include, at least one data line, and at least one delay element, in which the cells arranged in a row have a second cell situated at a second end of the row, in which the at least one data line, and the at least one delay element electrically couple the first cell to the second cell, and are adapted to cause a time-delay to the electrical signals travelling therethrough to bring data signals in phase with the clock source of the second cell into phase at the first cell with the root clock source.

Advantageously, some embodiments of the invention further include, a clock line, and at least one delay element, in which the clock line, and the at least one delay element electrically couple the first cell to the second cell, and are adapted to cause a time-delay to the electrical signals travelling therethrough to bring a signal of the clock source of the second cell into phase at the first cell with the root clock source.

In some embodiments of the invention, the at least one cell has two clock domains and two clock sources.

In some embodiments of the invention, the cells are arranged in a two-dimensional rectilinear grid, the first cell situated at a first corner of the grid, and the second cell situated at a second corner of the grid opposite to the first corner.

In some embodiments of the invention, data and clock signals propagate in directions along two axes of the rectilinear grid, in which the at least one clock domain of the at least one other cell has one clock domain for the root clock of the first cell, and one clock domain for the root clock of the second cell.

In some embodiments of the invention, data and clock signals propagate in directions along two axes of the rectilinear grid, in which the at least one clock domain of the at least one other cell has two clock domains for the root clock of the first cell, and two clock domains for the root clock of the second cell.

Advantageously, in some embodiments of the invention, the second cell is adapted to generate its root clock signal from a time-delayed version of the root clock signal of the first cell.

According to a second broad aspect the invention provides for a cell of an integrated circuit having at least one clock domain, the at least one clock domain having a clock source, the cell having at least one neighboring cell and adapted to accept data in at least one direction of propagation, the at least one neighboring cell situated adjacent to the cell in the reverse direction of the at least one direction of propagation and having a neighboring cell clock source generating a neighboring cell clock signal, in which the clock source generates a time-delayed clock signal which is a time-delayed version of the neighboring cell clock signal of the at least one neighboring cell, in which the time-delayed clock signal is delayed with respect to the neighboring cell clock signal by a time corresponding to a data propagation delay for data to propagate from the neighboring cell clock source to the clock source of the cell.

According to a third broad aspect, the invention provides for a method of clocking an arrangement of integrated circuit cells including generating in at least one root clock cell at least one root clock signal at at least one root clock source, generating in at least one cell a time-delayed clock signal which is a time-delayed version of the at least one root clock signal at a cell clock source of the at least one cell, in which the time-delayed clock signal is delayed with respect to the at least one root clock signal by a time corresponding to a data propagation delay for data to propagate from the at least one root clock source of the at least one root clock cell to the cell clock source of the at least one cell.

According to a fourth broad aspect, the invention provides for a method of clocking a cell of an integrated circuit including generating a time-delayed clock signal in at least one clock domain of the cell at a clock source of the cell, in which the time-delayed clock signal is a time-delayed version of a clock signal of a neighboring cell clock signal of at least one neighboring cell of the cell, in which the time-delayed clock signal is delayed with respect to a neighboring cell clock source of the at least one neighboring cell by a time corresponding to a data propagation delay for data to propagate from the neighboring cell clock source of the at least one neighboring cell to the clock source of the cell.

According to a fourth broad aspect, the invention provides a cell of an integrated circuit, comprising a plurality of clock domains for clocking signals in at least two directions of propagation.

Other aspects and features of the present invention will become apparent to those of ordinary skill in the art upon review of the following description of specific embodiments of the invention in conjunction with the accompanying figures.

BRIEF DESCRIPTION OF THE DRAWINGS

Preferred embodiments of the invention will now be described with reference to the accompanying diagrams, in which.

DETAILED DESCRIPTION OF THE PREFERRED EMBODIMENTS

Figure 1A:
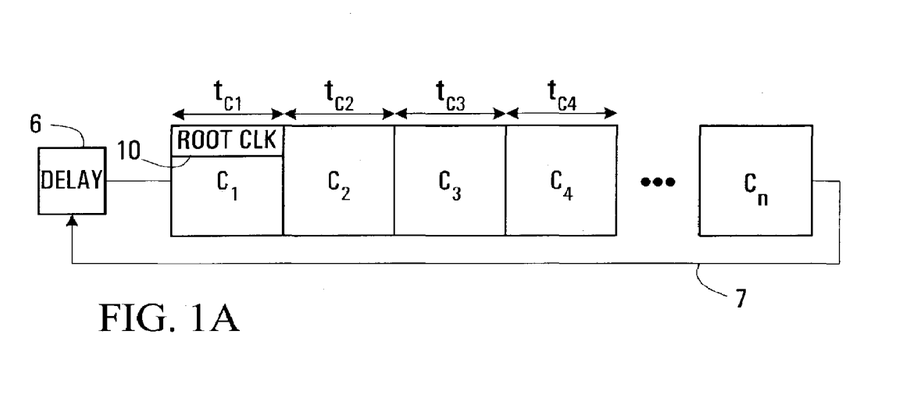
FIG. 1A is a schematic view of a row of integrated circuit cells timed according to one embodiment of the invention in which one root clock is used.

With reference to FIG. 1A, a row of integrated circuit cells timed according to one embodiment of the invention using one root clock 10, is described. The root clock 10 originates in cell $C_1$ in which there is an associated propagation delay $t_{c1}$. This means that the root clock signal upon reaching the rightmost boundary of cell $C_1$ is out of phase (in time) with the source of the root clock signal by a delay or skew of $t_{c1}$. Furthermore, since data moving across the cell also experiences substantially equivalent propagation delays to those experienced by the clock signal, the data signals will also be out of phase with their sources. Thus, synchronizing a clock in cell $C_2$ or other cells to the root clock 10, at its source, causes the data and clock signals to move out of phase with each other. According to the embodiment depicted in FIG. 1A, the clock signal within cell $C_2$ is deliberately set to be out of phase with the source of the root clock 10 by a time $t_{C1}$ corresponding to the propagation delay of signals traversing $C_1$. Specifically, instead of the clock domain of $C_2$ being synchronized with the source of $C_1$ (root clock 10), it comprises a similar clock signal delayed by time $t_{c1}$. In this way, data travelling from $C_1$ to $C_2$ arrives in phase with the clock of $C_2$. In a similar manner the clock signal within cell $C_3$ is set to be deliberately out of phase with the clock signal source within cell $C_2$ by $t_{C2}$, wherein $t_{C2}$ is the propagation delay the data and clock signals experience as they traverses cell $C_2$. Similarly, the clock domain of $C_3$ is not synchronized with the clock of $C_2$, but instead comprises a similar clock signal delayed further by time $t_{C2}$ In general, due to substantially similar delay in data propagation and the clock signal, a clock signal of a subsequent cell may be referenced to the delayed clock signal of the previous cell from which the clock signal originates, with the exception of the cell that contains the root clock 10 which can either be referenced to itself or an in-phase copy of the signal it serves as the origin for. Each delay therefore, is chosen to correspond to the data propagation and clock delay of the previous cell so that when the clock signal and the data actually arrives from the previous cell it does so in phase with the clock of the subsequent cell. In this manner, although the cell clocks are not synchronized in time, the clocks are phase offset such that they together comprise a wavefront clock which is synchronized with data as it propagates along the row of cells. One way to achieve this delay is to send the root clock with the data and to synchronize subsequent clocks to it using for example relays or PLLs.

Figure 1B:
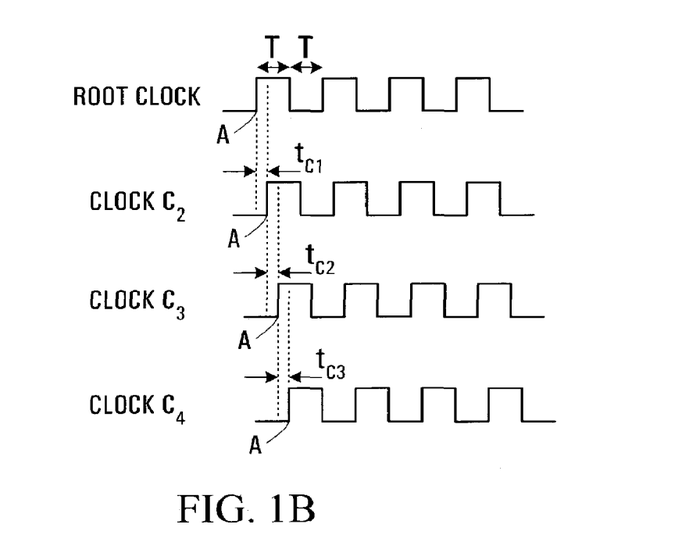
FIG. 1B is an associated timing diagram illustrating the deliberately de-phased clock signals for the respective clock domains of the cells of FIG. 1A.

In FIG. 1B an example set of timing waveforms is shown for clock signals of four sequential cells of FIG. 1A. In this example root clock 10 outputs a square wave of period 2T with a 50% duty cycle although other waveform clocks may be used. The rising edge A is delayed in the arrangement of sequential cells according to respective propagation delays of the previous cells and the clock signals are deliberately kept out of phase so that data can be passed between cells wavefront synchronously. The clock of cell $C_2$, which could be referenced to the skewed version of the root clock, is delayed by time $t_{C1}$, which corresponds to the delay across cell $C_1$. This brings the clock of $C_2$ in phase with the expected arrival of the skewed clock and delayed data of cell $C_1$. The clock of cell $C_3$, which could be referenced to the skewed version of the clock of cell $C_2$, is delayed by time $t_{C2}$ in relation to the clock of cell $C_2$ which corresponds to the delay across cell $C_2$. This brings the clock of $C_3$ in phase with the expected arrival of the delayed data of cells $C_2$ and $C_1$, and the skewed clock of cell $C_2$. The clock of cell $C_4$, which could be referenced to the skewed version of the clock of cell $C_3$, is delayed by time $t_{C3}$ in relation to the clock of cell $C_3$ which corresponds to the delay across cell $C_3$. This brings the clock of $C_4$ in phase with the expected arrival of the delayed data of cells $C_3$, $C_2$ and $C_1$. and the skewed clock of cell $C_3$. In general each clock is offset so that data arriving from any previous cell would, due to the inherent propagation delay, be in phase with the clock of that cell. What is important to note from this diagram is that the timing reference, rising edge A, is increasingly delayed relative to that of the root clock, from cell to cell along the direction of signal propagation.

It should be noted that since the clock propagation delay through each cell itself is being used as the offset for the clock timing of the neighboring cell, the clock frequency itself is not limited by the clock skew. It also should be noted that since data propagating from cell to cell travels in phase with the wavefront clock, the data does not need to wait for subsequent clock cycles to propagate, resulting in high-rate data transfer across a large dimension single substrate.

One issue in timing the cells in this manner is that only data signals moving in one direction (shown in the diagram as left to right) can take advantage of this wavefront clock synchronization. This is due to the fact that the timing reference, rising edge A, is increasingly delayed relative to that of the root clock, from cell to cell only along the direction of signal propagation, namely left to right. Data signals propagating in the reverse direction do not take advantage of wavefront clock synchronization and are subject to at least the same problems of the prior art wherein data timing may be difficult to manage and data may have to wait for subsequent clock cycles to propagate from cell to cell as introduced above. In order to take advantage of the benefits of wavefront clock synchronization when passing data from a cell on the right to a cell on the left, say from cell $C_2$ back to cell $C_1$, delay elements or element 6, a set of data and lines, and a clock line (represented schematically by a single line 7) from $C_n$ back to $C_1$ are provided, forming a ring. For $C_2$ to pass data to $C_1$, the data moves all the way around the ring, going through cell $C_n$, over lines 7 and delay elements 6 to reach cell $C_1$. The delay elements 6 ensures that the data and clock signal being passed to cell $C_1$ are in phase with the root clock signal that originates in cell $C_1$. The latency contributed by the delay elements 6 is adapted so that the total delay of the data and clock from the root cell $C_1$ through the row, through $C_n$ and back through the ring and the delay elements 6 is an integer multiple of the period of a clock cycle of the root clock 10. In this manner, the signals emerging from the delay elements 6 are brought into phase with those originating in $C_1$. The delay elements 6 of this embodiment could be for example a series of inverters although in general they could be any set of elements suitable for generating the appropriate delay. This embodiment, however, adds an additional delay to the substantial latency contributed by the lines 7 between $C_n$ and $C_1$ which increases the time delay asymmetry between data transfers to higher numbered cells and data transfers to lower numbered cells which pass around the ring. In alternate arrangements the total latency contributed by delay elements for proper phase matching may be effected throughout the row of cells by distributing the delay elements evenly between or amongst the cells. In this manner the time delay asymmetry for data propagation between different sets of cells may be reduced.

Figure 2A:
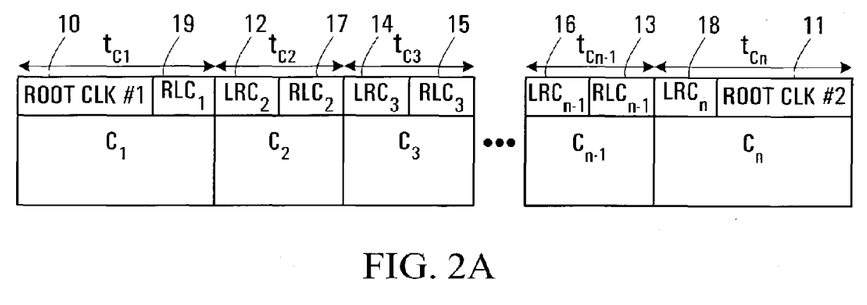
FIG. 2A is a schematic view of a row of integrated circuit cells timed according to an embodiment of the invention in which two root clocks are used.

With reference to FIG. 2A, another embodiment of the present invention is shown in which data moving from left-to-right and right-to-left may take advantage of wavefront clock synchronization according to the invention. In this embodiment two root clocks are used, root clock #1 10 in cell $C_1$ and root clock #2 11 in cell $C_n$. This embodiment is similar to that of FIG. 1A with the exception that the clock and data signals do not need to wrap around the row of cells via a line 7, and a set of delay elements 6 for each clock is not required, however, embodiments that include such features may be of interest as they provide dual data paths and are contemplated to be within the scope of the present invention. This elimination of the need to send signals around a ring reduces latency and latency asymmetry. To ensure the benefits in the embodiment illustrated in FIG. 2A of wavefront clock synchronization for propagation of data in both directions, each cell is adapted to synchronize to the skewed clock and delayed data of both of its neighboring cells. In other words all cells in this embodiment are adapted to handle (i.e. accept and deliver) data within two clock domains.

Figure 2B:
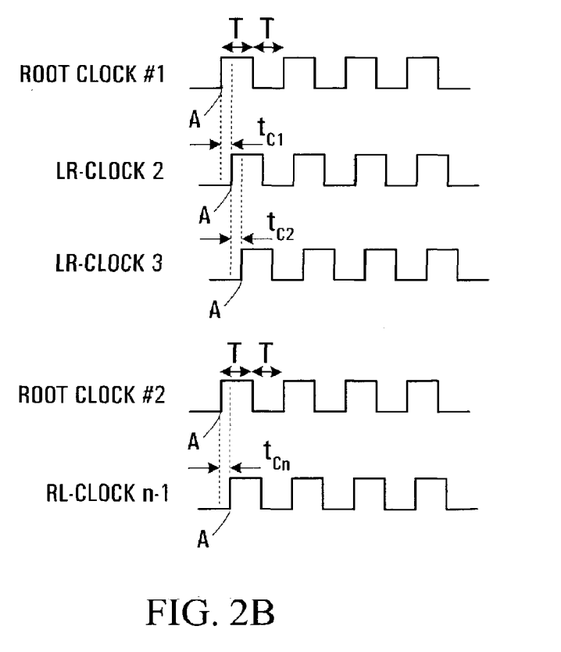
FIG. 2B is an associated timing diagram illustrating the deliberately de-phased clock signals for the respective clock domains of the cells of FIG. 2A.

As described for the embodiment illustrated in FIG. 1A, each cell has an associated propagation delay. Each of the left-to-right clocks (LRCs) 12, 14, 16, and 18 (whose source is root clock #1 10) and each of the right-to-left clocks (RLCs) 13, 15, 17, and 19 (whose source is root clock #2 11) will have clock signals that are deliberately out of phase with their respective root clocks (10 or 11). FIG. 2B illustrates the associated timing diagram for a number of clock signals in FIG. 2A. The phase differences for the clock domains of the left-to-right clocks are the same as those illustrated in FIGS. 1A and 1B. Specifically, the left-to-right clock of cell $C_2$ is a similar version of the root clock delayed by time $t_{C1}$. The phase differences for the clock domains of the right-to-left clocks are similar but are increasingly de-phased in the opposite spatial direction to enable appropriate wavefront clock synchronization in the opposite direction of data propagation. Specifically, the right-to-left clock domain of each cell, is phase delayed with respect to the right-to-left clock domain of its neighboring cell to the right instead of its neighboring cell to the left, so that the clock phase matches the propagation delay of data travelling to the left. Specifically, the right-to-left clock domain of $C_{n-1}$ ($RLC_{n-1}$) comprises a clock signal similar to its root clock #2 11 delayed by time $t_{Cn}$. In this way, data travelling from $C_n$ to $C_{n-1}$ arrives in phase with the clock of $C_{n-1}$. Typically within each cell, it is expected that timing circuitry is employed so that data arriving from one set of clock domains can cross over to or interact with data of the other set of clock domains.

Figure 3A:
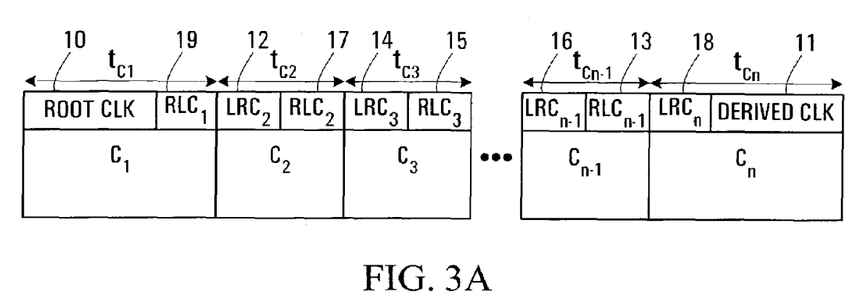
FIG. 3A is a schematic view of a row of integrated circuit cells timed according to one embodiment of the invention, in which a second clock is derived from the first clock.
Figure 3B:
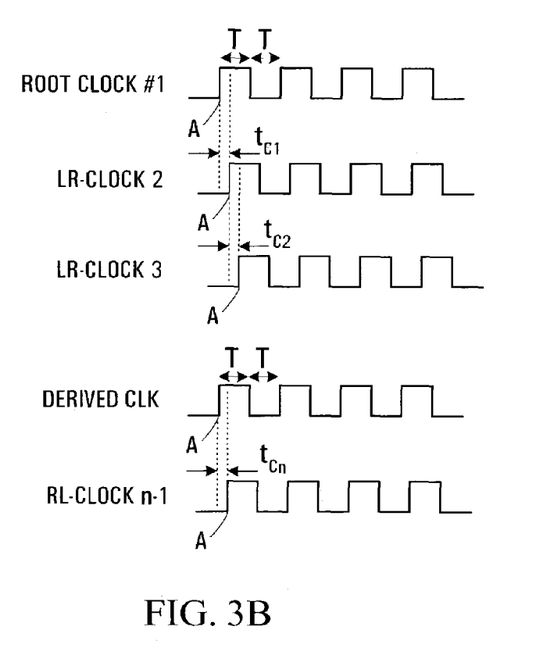
FIG. 3B is an associated timing diagram illustrating the deliberately de-phased clock signals for the respective clock domains of the cells of FIG. 3A.

FIG. 3A is a schematic view of a row of integrated circuit cells timed according to one embodiment of the invention, in which a second clock 11 is derived from the first clock 10. This embodiment of the invention uses the last cell in the row to derive a clock signal from a delayed version of the signal originating from the source of the root clock 10. Specifically, in one implementation of this embodiment, cell $C_n$ generates a derived clock 11 from a delayed version of the clock of cell $C_{n-1}$. This derived clock is used as the root clock for all of the subsequent right-to-left clocks (RLCs) 13, 15, 17, and 19. As in the previous embodiment this embodiment requires that all the cells have two clock domains, one for each direction of signal propagation (i.e. left-to-right clocks 12, 14, 16, and 18, and right-to-left clocks 13, 15, 17, and 19). This embodiment may be preferred in a situation in which the root clock 10, instead of being on the integrated circuit originates from somewhere off the substrate, say in an off-chip crystal oscillator, and is fed into a cell in the row. FIG. 3B is the associated timing diagram for the clock signals in FIG. 3A, and it is easily seen that the timing is the same as that of the embodiment illustrated in FIGS. 2A and 2B, except in the previous embodiment there was no specific relationship between the left-to-right clocks, and the right-to-left clocks. In this embodiment the right-to-left clocks are derived from the left-to-right clocks.

Figure 4:
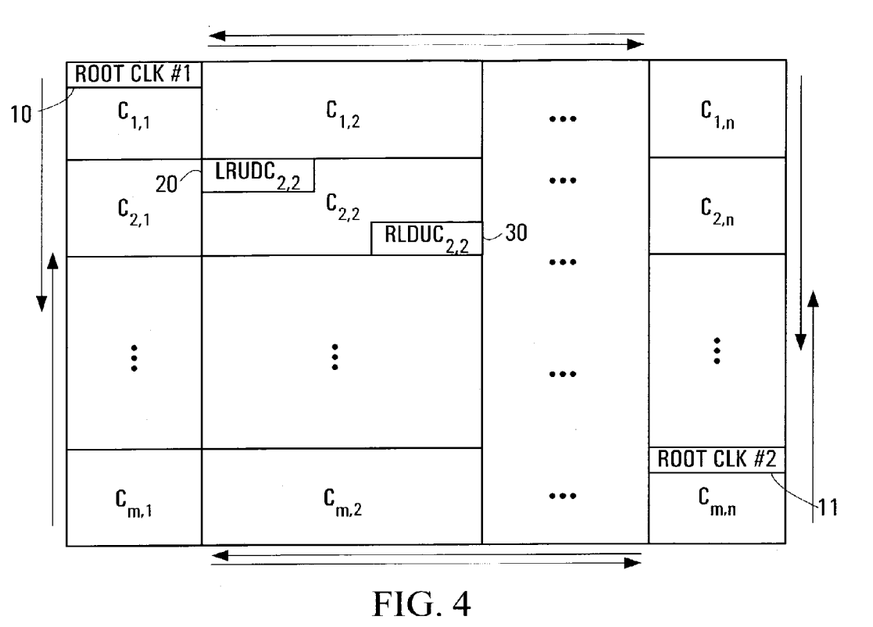
FIG. 4 is a schematic view of an m-by-n grid of integrated circuit cells with timing according to one embodiment of the invention in which two root clocks are used and each cell has two clock domains.

FIG. 4 is a schematic view of an m-by-n grid of integrated cells with timing according to one embodiment of the invention in which two root clocks are used. The two root clocks #1 10 and #2 11 are at opposite corners (i.e. separated by a diagonal) on the grid. The clock sources are separated in this symmetrical manner so that the phase delays throughout the grid for all directions of signal propagation are evenly spaced, with respect to their phase offsets, in time for each direction of propagation.

In this embodiment of the invention each clock is responsible for a horizontal and a vertical direction of signal propagation. Root clock #1 10, for example, could be used for wavefront clock synchronization and data propagation in all cells for the left-to-right direction of signal propagation and for the up-to-down direction of signal propagation, acting as a "left-to-right-up-to-down" clock, in which case root clock #2 11 would then be responsible for the timing of the right-to-left direction of signal propagation and the down-to-up direction of signal propagation, acting as a "right-to-left-down-to-up" clock. The propagation of signals in the two-dimensional grid is analogous to that of the signal propagation in a row. The difference being that each cell is now made responsible for tracking one phase offset copy of each root clock and therefore maintaining a clock signal for each of the two root clocks which are each responsible for two directions of signal propagation (shown only for cell $C_{2,2}$). Thus there are two clock domains within each cell to enable each cell to pass and accept signals from each of its four neighbors in the grid. In general, the vertical and horizontal delays across every cell are nearly exactly the same, and as such each cell only requires two clock domains, the corresponding vertical and horizontal clock domains originating from the same root clock always being in phase no matter what path is considered resulting in co-synchronization of a vertical and a horizontal clock. In general this will be true to within a small fraction of a clock cycle. As such this embodiment only uses two clock domains per cell. For example, cell $C_{2,2}$ is shown with its two clocks, its left-to-right and up-to-down clock ($LRUDC_{2,2}$) 20, and its right-to-left and down-to-up clock ($RLDUC_{2,2}$) 30. Each clock serves as both a horizontal and a vertical clock and in each dimension and the cells are arranged and function just as those of the previous embodiments, generating a phase delayed version of the clocks of their neighbors based on the clock skew and data propagation delay of their respective horizontal and vertical neighbors. Specifically, the left-to-right and up-to-down clock ($LRUDC_{2,2}$) 20 is a delayed version of the left-to-right and up-to-down source clock (not shown) of cell $C_{1,2}$, delayed by an amount corresponding to the time delay of signals travelling across cell $C_{1,2}$ in a downward direction. Such a time could be labeled say $t_{LRUD-1,2}$. The right-to-left and down-to-up clock (RL- $DUC_{2,2}$) 30 is a delayed version of the right-to-left and down-to-up source clock (not shown) of cell $C_{3,2}$, delayed by an amount corresponding to the time delay of signals travelling across cell $C_{3,2}$ in an upward direction. Such a time could be labeled say $t_{RLDU-3,2}$. In one embodiment, edge cells at the end of a given row or column, which are not corners, function to pass clock signals along that row or column based on an appropriate clock input it receives from an appropriate orthogonal direction. For example a cell on the left edge $C_{i,1}$ which has no input from the left, passes a left-to-right and up-to-down clock to cell $C_{i,2}$ from the "left-to-right-up-to-down" clock signal it receives from the cell neighbor above it ($C_{i-1,1}$), and not from the "right-to-left-down-to-up" clock signal it receives from the cell below it ($C_{i-1,1}$).

Similarly, a cell on the bottom edge $C_{m,i}$ would pass a right-to-left and down-to-up clock signal based on the "right-to-left-down-to-up" clock signal it receives from its neighbor on the right ($C_{m,i+1}$), a cell on the right edge $C_{i,n}$ would pass a right-to-left and down-to-up clock based on the "right-to-left-down-to-up" clock it receives from its neighbor below it ($C_{i+1,n}$), and a cell on the top edge $C_{1,i}$ would pass a left-to-right and up-to-down clock based on the "left-to-right-up-to-down" clock it receives from its neighbor to the left ($C_{1,i-1}$). Similar to the previous embodiment, typically within each cell, it is expected that timing circuitry is employed so that data arriving from one clock domain can cross over to or interact with data of the other clock domain.

Figure 5:
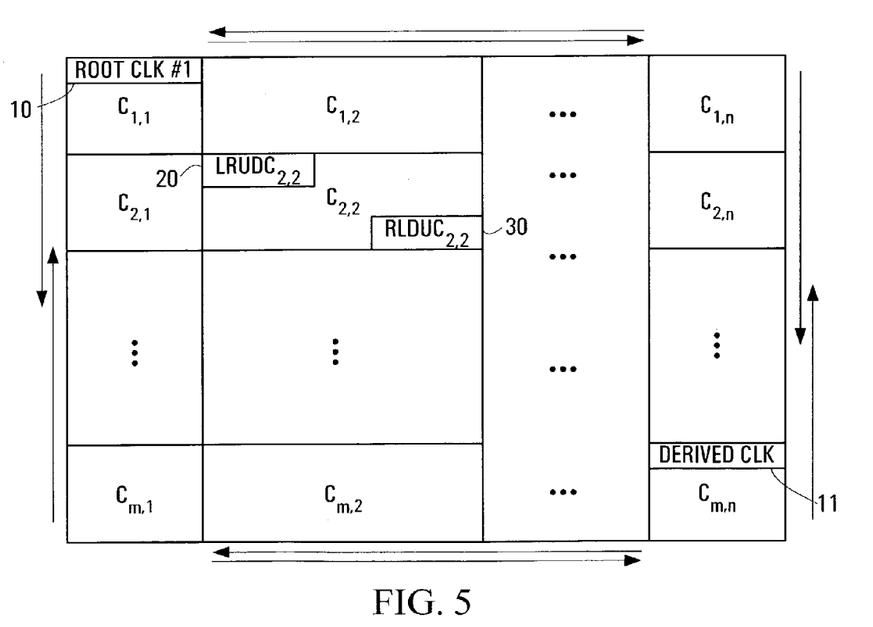
FIG. 5 is a schematic view of an m-by-n grid of integrated circuit cells with timing according to one embodiment of the invention in which a second clock source is derived from a root clock and each cell has two clock domains.

FIG. 5 is a schematic view of an m-by-n grid of integrated circuit cells with timing according to one embodiment of the invention in which the second clock source is derived from the root clock #1 10. This embodiment of the invention is similar to that of FIG. 3A, in that a second clock 11 of cell $C_{m,n}$ is derived from the one root clock #1 10 of cell $C_{1,1}$. The derived clock 11, is at the cell in the opposite corner of the root clock #1 10 as a second root clock #2 was in the previous embodiment. In all respects other than the replacement of the second root clock with a derived clock, the embodiment depicted in FIG. 5 is arranged and functions as the embodiment described in association with FIG. 4.

Figure 6:
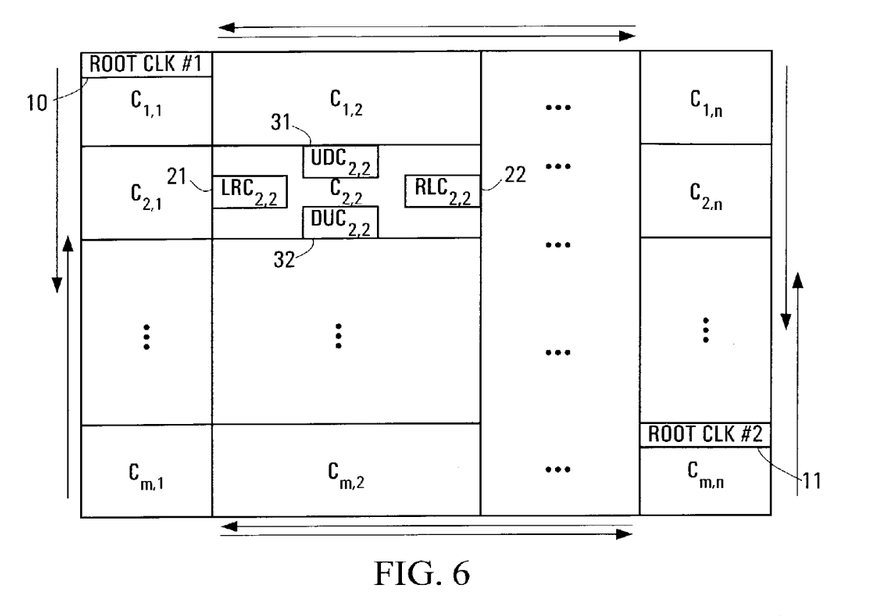
FIG. 6 is a schematic view of an m-by-n grid of integrated circuit cells with timing according to one embodiment of the invention in which two root clocks are used and each cell has four clock domains.

FIG. 6 is a schematic view of an m-by-n grid of integrated cells with timing according to another embodiment of the invention in which two root clocks are used. The two root clocks #1 10 and #2 11 are at opposite corners (i.e. separated by a diagonal) on the grid. The clock sources are separated in this symmetrical manner so that the phase delays throughout the grid for all directions of signal propagation are evenly spaced, with respect to their phase offsets, in time for each direction of propagation.

As in the embodiment described in association with FIG. 4, in this embodiment of the invention each clock is responsible for a horizontal and a vertical direction of signal propagation. Root clock #1 10, for example, could be used for wavefront clock synchronization and data propagation in all cells for the left-to-right direction of signal propagation and for the up-to-down direction of signal propagation, acting as a "left-to-right-up-to-down" clock, in which case root clock #2 11 would then be responsible for the timing of the right-to-left direction of signal propagation and the down-to-up direction of signal propagation, acting as a "right-to-left-down-to-up" clock. The propagation of signals in the two-dimensional grid is analogous to that of the signal propagation in a row. The difference being that each cell is now made responsible for tracking two phase offset copies of each root clock and therefore maintaining a clock signal for each of the four directions of signal propagation (shown only for cell $C_{2,2}$). In this embodiment no assumptions are made with respect to whether or not the vertical and horizontal delays across every cell are exactly the same. As such, this embodiment contemplates the rare situation where the phase of a root clock signal traversing cells vertically and horizontally using different paths may not be exactly in phase when it arrives at any given cell due to some unique timing issues at each cell at any given time. In order to provide wavefront synchronization in such a situation four clock domains within each cell are used to enable each cell to pass and accept signals from each of its four neighbors in the grid. For example, cell $C_{2,2}$ is shown with its four clocks, its left-to-right clock ($LRC_{2,2}$) 21, its right-to-left clock ($RLC_{2,2}$) 22, its up-to-down clock ($UDC_{2,2}$) 31, and its down-to-up clock ($DUC_{2,2}$) 32. The horizontal clocks (LRCs, and RLCs) are arranged and function just as those of the previous embodiments, generating a phase delaying version of the clocks of their neighbors based on the clock skew and data propagation delay of their horizontal neighbors. The vertical clocks (UDCs and DUCs) are arranged and behave in a completely similar (albeit rotated) manner due to the symmetrical rectangular (which includes a square) layout. Specifically, the up-to-down clock ($UDC_{2,2}$) 31 is a delayed version of the up-to-down source clock (not shown) of cell $C_{1,2}$, delayed by an amount corresponding to the time delay of signals travelling across cell $C_{1,2}$ in a downward direction. Such a time could be labeled say $t_{UD-1,2}$. The down-to-up clock ($DUC_{2,2}$) 32 is a delayed version of the down-to-up source clock (not shown) of cell $C_{3,2}$, delayed by an amount corresponding to the time delay of signals travelling across cell $C_{3,2}$ in an upward direction. Such a time could be labeled say $t_{DU-3,2}$. As with the embodiment described in association with FIG. 4, edge cells at the end of a given row or column, which are not corners, function to pass clock signals along that row or column based on an appropriate clock input it receives from an appropriate orthogonal direction. For example a cell on the left edge $C_{i,1}$ which has no input from the left, passes a left-to-right clock to cell $C_{i,2}$ from the "left-to-right-up-to-down" clock signal it receives from the cell neighbor above it ($C_{i-1,1}$), and not from the "right-to-left-down-to-up" clock signal it receives from the cell below it ($C_{i+1,1}$). Similarly, a cell on the bottom edge $C_{m,i}$ would pass an down-to-up clock signal based on the "right-to-left-down-to-up" clock signal it receives from its neighbor on the right ($C_{m,i+1}$), a cell on the right edge $C_{i,n}$ would pass a right-to-left clock based on the "right-to-left-down-to-up" clock it receives from its neighbor below it ($C_{i+1,n}$), and a cell on the top edge $C_{1,i}$ would pass an up-to-down clock based on the "left-to-right-up-to-down" clock it receives from its neighbor to the left ($C_{1,i-1}$). Similar to the previous embodiment, typically within each cell, it is expected that timing circuitry is employed so that data arriving from any of the clock domains can cross over to or interact with data of any of the other clock domains.

Figure 7:
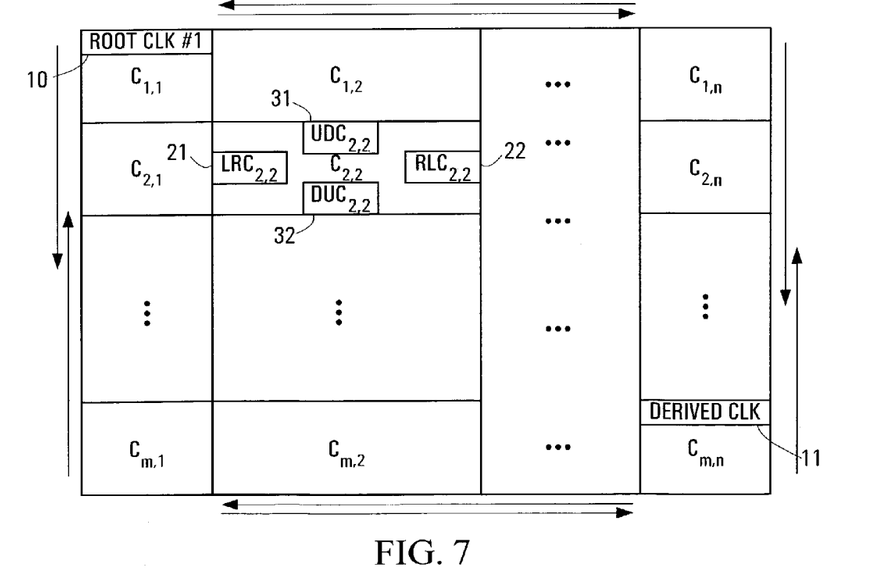
FIG. 7 is a schematic view of an m-by-n grid of integrated circuit cells with timing according to one embodiment of the invention in which a second clock source is derived from a root clock and each cell has four clock domains.

FIG. 7 is a schematic view of an m-by-n grid of integrated circuit cells with timing according to one embodiment of the invention in which the second clock source is derived from the root clock #1 10. This embodiment of the invention is similar to that of FIG. 3A, in that a second clock 11 of cell $C_{m,n}$ is derived from the one root clock #1 10 of cell $C_{1,1}$. The derived clock 11, is at the cell in the opposite corner of the root clock #1 10 as a second root clock #2 was in the previous embodiment. In all respects other than the replacement of the second root clock with a derived clock, the embodiment depicted in FIG. 5 is arranged and functions as the embodiment described in association with FIG. 6.

In keeping with the specific illustration of a number of preferred embodiments, in general for all embodiments of the present invention it is important that each cell has the ability to track and maintain phase off set versions of the clock domains from each direction of signal propagation. In order to maintain these deliberately de-phased clock domains from each direction (or set of directions) of signal propagation, a domain unique to a cell is defined such that adjacent cells, for a prescribed direction of signal propagation, have clock domains that are deliberately de-phased in relation to one another such that the phase offset is equivalent to the skew obtained by a periodic waveform traversing the dimension of the cell in the direction of the prescribed signal propagation.

Preferably, circuits substantially equivalent to a phase-locked loop (PLL), or a delay locked loop (DLL) would be used to maintain one of the four clock domains within each cell. Thus, each cell would require such a circuit for each direction of signal propagation in which it wishes to pass and accept data.

It is to be understood that the term "data propagation" as referred to in association with the preferred embodiments of the invention herein depend on what elements are implemented to effect such a propagation. The data propagation and clock delay used as the reference to set the phase offsets of neighboring cell clock domains will thus depend on the design of the cells and the manner in which data and clock signals are sent between neighboring cells or from one cell to any other cell. In this manner the invention contemplates embodiments wherein data and clock propagation may pass through a series of integrated elements thereby undergoing a certain delay, contemplates data and clock propagation occurs across a simple bus, and contemplates any other type of propagation as long as neighboring cell clock domains are appropriately phase offset to synchronize the wavefront clock with the propagation of data.

Although all of the embodiments shown have rectangular cells which are arranged in a repeating linear configuration, the invention contemplates the use of cells of other shapes arranged in different configurations as long as the time delayed clock domains are arranged to create a wavefront clock which is synchronized with the propagation of data throughout the configuration from cell to cell.

Although only embodiments in 1D vector and 2D array cell configurations been specifically illustrated, any dimensional topology of interconnected cells may be mapped onto a 2D integrated circuit. In general any N-D topology could be mapped onto the 2D integrated circuit as long as the time for data to propagate between any two cells is the same for all of the shortest paths between them through the topology. For such an N-D generalization to work, at most 2N root clocks would be required.

Numerous modifications and variations of the present invention are possible in light of the above teachings. It is therefore to be understood that within the scope of the appended claims, the invention may be practised otherwise than as specifically described herein.

We claim:

1. An arrangement of integrated circuit cells comprising:
   at least one cell comprising a root clock source generating a root clock signal;
   at least one other cell having at least one clock domain, said at least one clock domain having a clock source generating a time-delayed clock signal which is a time-delayed version of the root clock signal, wherein the time delayed clock signal is delayed with respect to the root clock signal by a time corresponding to a data propagation delay for data to propagate from the root clock source to the clock source of the clock domain;
   at least one data line; and
   at least one delay element,
   wherein said integrated circuit cells are arranged in a row including a first cell situated at a first end of said row, wherein the at least one cell is said first cell, and wherein the at least one clock domain is associated with the root clock of the first cell, the row further comprising a second cell having a clock source and being situated at a second end of the row, wherein the at least one data line, and the at least one delay element electrically couple the first cell to the second cell, and are adapted to cause a time-delay to the electrical signals travelling therethrough to bring data signals in phase with the clock source of the second cell into phase at the first cell with the root clock source.

2. The arrangement of integrated circuit cells according to claim 1 further comprising:
   a clock line; and
   an other at least one delay element,
   wherein the clock line, and the other at least one delay element electrically couple the first cell to the second cell, and are adapted to cause a time-delay to the electrical signals travelling therethrough to bring a signal of the clock source of the second cell into phase at the first cell with the root clock source.

3. The arrangement of integrated circuit cells according to claim 1, wherein said row includes a second cell situated at a second end of the row, and wherein each of the cells arranged in the row have two said clock domains and two said clock sources.

4. The arrangement of integrated circuit cells according to claim 3 wherein the second cell is adapted to generate its root clock signal from a time-delayed version of the root clock signal of the first cell.

5. A cell of an integrated circuit having a first clock domain and a second clock domain, said first clock domain and said clock domain each having a clock source, said cell having at least one neighboring cell and adapted to accept data in a first direction of propagation and a second direction of propagation opposite to the direction of the first direction of propagation, wherein the at least one neighboring cell comprises a first neighboring cell and a second neighboring cell, said first and second neighboring cell each having a neighboring cell clock source generating a neighboring cell clock signal, wherein said clock source generates a time-delayed clock signal which is a time-delayed version of the neighboring cell clock signal of the respective neighboring cell, wherein the time-delayed clock signal is delayed with respect to the neighboring cell clock signal by a time corresponding to a data propagation delay for data to propagate from the neighboring cell clock source to the clock source of said cell.

6. The cell of an integrated circuit according to claim 5, further comprising a third direction of propagation and a fourth direction of propagation opposite to the direction of the third direction of propagation, and further comprising a third neighboring cell and a fourth neighboring cell.

7. The cell of an integrated circuit according to claim 5, further comprising a third clock domain and a fourth clock domain, a third direction of propagation and a fourth direction of propagation opposite to the direction of the third direction of propagation, and a third neighboring cell and a fourth neighboring cell.

8. A cell of an integrated circuit, comprising a plurality of clock domains for clocking signals in at least two directions of propagation, the cell being disposed between a first neighbor cell and a second neighbor cell, the first neighbor cell situated adjacent said cell along a first one of the at least two directions of propagation and having a first neighbor clock source generating a first neighbor clock signal, the second neighbor cell situated adjacent said cell along a second one of the at least two directions of propagation and having a second neighbor clock source generating a second neighbor clock signal, wherein said plurality of clock domains includes a first clock domain and a second clock domain, wherein said first clock domain includes a first clock source generating a first time-delayed clock signal that is delayed with respect to the first neighbor clock signal by a time required for data to propagate from the first neighbor clock source to the first clock source of said cell, wherein said second clock domain includes a second clock source generating a second time-delayed clock signal that is delayed with respect to the second neighbor clock signal by a time required for data to propagate from the second neighbor clock source to the second clock source of said cell.

* * * * *